US011950038B1

(12) United States Patent
Lin et al.

(10) Patent No.: US 11,950,038 B1
(45) Date of Patent: Apr. 2, 2024

(54) MICROPHONE FRONT CHAMBER STRUCTURE AND VOICE RECEPTION DEVICE

(71) Applicant: Merry Electronics(Shenzhen) Co., Ltd., ShenZhen (CN)

(72) Inventors: Kuei-Yuan Lin, Taichung (TW); Hung-Yue Chang, Taichung (TW); Hsiu-Hung Yeh, Taichung (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 0 days.

(21) Appl. No.: 17/970,549

(22) Filed: Oct. 20, 2022

(30) Foreign Application Priority Data

Sep. 22, 2022 (TW) ................................. 111135967

(51) Int. Cl.
*H04R 1/08* (2006.01)
*H04R 1/02* (2006.01)
*H04R 1/22* (2006.01)

(52) U.S. Cl.
CPC ............. *H04R 1/083* (2013.01); *H04R 1/021* (2013.01); *H04R 1/222* (2013.01)

(58) Field of Classification Search
CPC ......... H04R 1/083; H04R 1/021; H04R 1/222
See application file for complete search history.

(56) References Cited

U.S. PATENT DOCUMENTS

2022/0360875 A1* 11/2022 Takano ................ H04R 1/1016

FOREIGN PATENT DOCUMENTS

AT 523698 A2 * 10/2021 ........... G10K 11/162

* cited by examiner

*Primary Examiner* — Kile O Blair
(74) *Attorney, Agent, or Firm* — JCIPRNET

(57) ABSTRACT

A microphone front chamber structure is adapted to be disposed on a front side of a voice reception hole of a microphone unit. The microphone front chamber structure includes a shell and a microphone holder. The shell has a first hole. The microphone holder is disposed in the shell and has a second hole corresponding to the first hole. The first hole and the second hole form a front chamber. The first hole has a first width at a position farthest away from the microphone holder. The second hole includes first and second sections arranged along an axis. On the axis, the first section has a tapered width along the axis and away from the shell. The second section has a second width constant along the axis. The first width is greater than the second width. A voice reception device including the microphone front chamber structure is also provided.

12 Claims, 5 Drawing Sheets

MICROPHONE FRONT CHAMBER STRUCTURE AND VOICE RECEPTION DEVICE

CROSS-REFERENCE TO RELATED APPLICATION

This application claims the priority benefit of Taiwan application serial no. 111135967, filed on Sep. 22, 2022. The entirety of the above-mentioned patent application is hereby incorporated by reference herein and made a part of this specification.

BACKGROUND

Technical Field

The disclosure relates to a front chamber structure and an audio device including the front chamber structure, and more particularly relates to a microphone front chamber structure and a voice reception device including the microphone front chamber structure.

Description of Related Art

In order to achieve a good noise reduction effect, the voice reception device, such as an earphone and a hearing aid, currently available on the market is provided with a cover on the shell hole of the voice reception device to reduce the amount of wind entering the voice reception device. In addition, in order to prevent the external wind from directly impacting the microphone diaphragm, the position of the microphone voice reception hole is deviated from a position directly below the shell hole so that the external wind does not directly pass through the microphone voice reception hole to impact the microphone diaphragm after passing through the shell hole.

However, after the above-mentioned adjustment is made to the voice reception device to enhance the noise reduction effect, the chamber between the shell hole and the microphone voice reception hole needs to be large enough, which instead makes it difficult to reduce the overall volume of the voice reception device. Therefore, how to provide the voice reception device, such as an earphone and a hearing aid, with a good noise reduction effect and reduce the overall volume of the voice reception device is an important research direction in this field.

SUMMARY

The disclosure provides a microphone front chamber structure and a voice reception device, which achieve a good noise reduction effect and have a reduced overall volume.

The microphone front chamber structure according to the disclosure is adapted to be disposed on a front side of a voice reception hole of a microphone unit. The microphone front chamber structure includes a shell and a microphone holder. The shell has a first hole, and the microphone holder is disposed in the shell and has a second hole corresponding to the first hole. The first hole and the second hole form a front chamber. The first hole has a first width at a position farthest away from the microphone holder, and the second hole includes a first section and a second section arranged along an axis. The first section is located between the first hole and the second section on the axis. The first section has a width that is tapered along the axis in a direction away from the shell, and the second section has a second width that is constant in the direction along the axis. The first width is greater than the second width.

The voice reception device according to the disclosure includes a shell, a microphone holder, a microphone unit, and a mesh structure. The shell has a first hole, and the microphone holder is disposed in the shell and has a second hole corresponding to the first hole. The first hole and the second hole form a front chamber. The first hole has a first width at a position farthest away from the microphone holder, and the second hole includes a first section and a second section arranged along an axis. The first section is located between the first hole and the second section on the axis. The first section has a width that is tapered along the axis in a direction away from the shell, and the second section has a second width that is constant in the direction along the axis. The first width is greater than the second width.

In an embodiment of the disclosure, a length of the second section along the axis is greater than or equal to 0.35 mm.

In an embodiment of the disclosure, a ratio of the first width to a length of the front chamber on the axis is less than 1.

In an embodiment of the disclosure, the shell includes a first wall surrounding the first hole, the microphone holder includes a second wall surrounding the second hole, and a first angle between the first wall and the second wall is greater than 90 degrees.

In an embodiment of the disclosure, the microphone holder includes a second wall surrounding the second hole, a second angle exists between a connection line, which is between a boundary between the first section and the second section and a position of the first hole farthest away from the microphone holder, and the axis, and the second angle is greater than 0 degrees and less than 25 degrees.

In an embodiment of the disclosure, the microphone holder includes a second wall surrounding the second hole, a third angle exists between the second wall and the mesh structure, and the third angle is greater than 0 degrees.

In an embodiment of the disclosure, the microphone holder includes a second wall surrounding the second hole, a second angle exists between a connection line, which is between a boundary between the first section and the second section and a position of the first hole farthest away from the microphone holder, and the axis, a third angle exists between the second wall and the mesh structure, and a sum of the second angle and the third angle is less than 90 degrees.

In an embodiment of the disclosure, the shell includes a first wall surrounding the first hole, a fourth angle exists between the first wall and the mesh structure, and the fourth angle is greater than or equal to 90 degrees.

In an embodiment of the disclosure, the first hole has a width that is constant in the direction along the axis.

In an embodiment of the disclosure, the first hole has a width that is tapered along the axis in a direction close to the microphone holder.

In an embodiment of the disclosure, a pore size of the mesh structure is less than 68 microns.

In an embodiment of the disclosure, the voice reception device further includes a sealing ring, and the microphone holder includes an annular groove located on an outer side wall, the sealing ring is located in the annular groove and abuts against the shell, and the microphone holder is not in direct contact with the shell.

Based on the above, in the microphone front chamber structure and the voice reception device of the disclosure, the external wind can repeatedly hit the width-tapered part of the first section after entering the front chamber formed by the first hole and the second hole of the microphone front chamber structure, so that the wind energy is dispersed and weakened before entering the microphone voice reception hole. Thereby, the wind noise received by the microphone unit can be reduced, and as a result, the voice reception device has a good noise reduction effect.

In addition, the conventional voice reception device requires a cover provided on the shell hole and needs to shift between the shell hole and the microphone voice reception hole to achieve the noise reduction effect. Since the chamber between the shell hole and the microphone voice reception hole needs to be large enough, it is difficult to reduce the overall volume of the voice reception device. In contrast, the voice reception device of the disclosure disperses and weakens the wind energy entering the microphone unit through the design of the tapered width of the first section. Therefore, the volume of the chamber between the shell hole and the microphone voice reception hole can be effectively reduced, and as a result, the voice reception device has a reduced overall volume.

Furthermore, in the microphone front chamber structure of the disclosure, the second hole of the microphone holder is provided with the second section. Therefore, the first section of the second hole can have higher accuracy and stability during the manufacturing process, which ensures that the wind energy entering the first section from the outside can be effectively dispersed and weakened by the first section before being received by the microphone unit, so that the voice reception device maintains a good noise reduction effect.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Figure 1A:
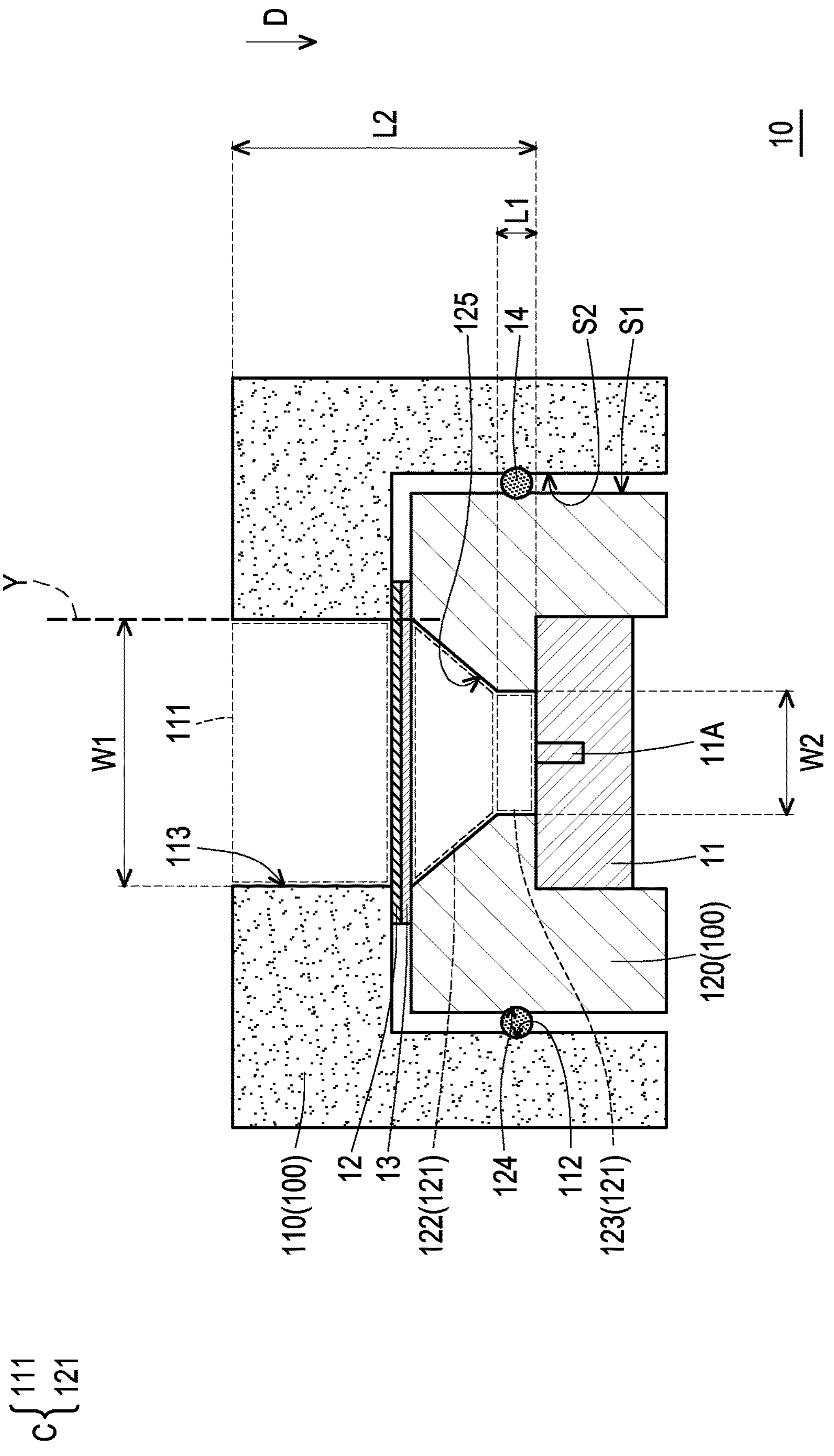
FIG. 1A and FIG. 1B are schematic cross-sectional views of the voice reception device according to an embodiment of the disclosure.
Figure 1B:
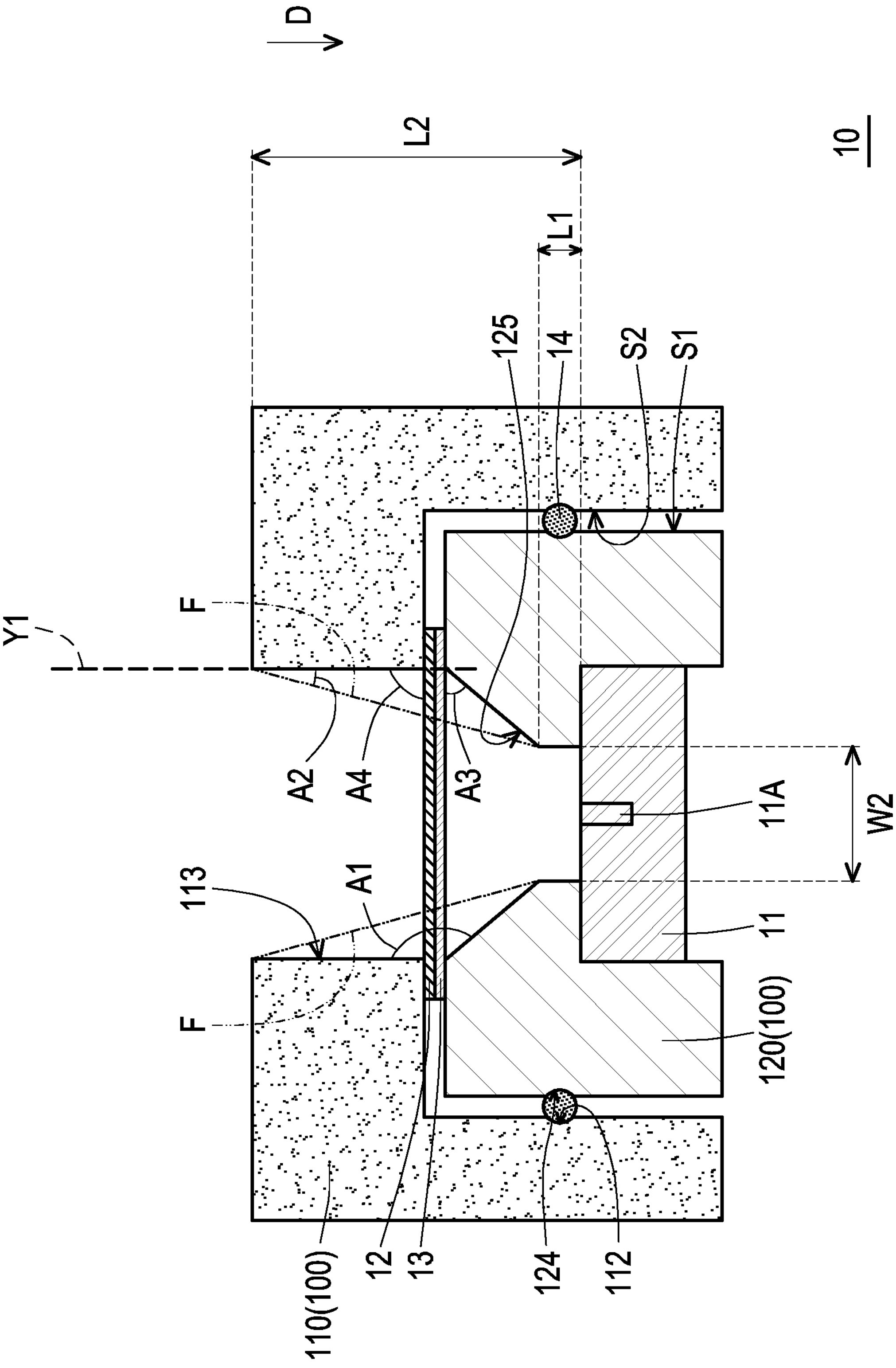

FIG. 1A and FIG. 1B are schematic cross-sectional views of a voice reception device according to an embodiment of the disclosure. Referring to FIG. 1A and FIG. 1B, the voice reception device 10 of this embodiment includes a microphone unit 11, a mesh structure 12, a foam structure 13, and a microphone front chamber structure 100. The microphone front chamber structure 100 is adapted to be disposed on the front side of a voice reception hole 11A of the microphone unit 11, and the microphone front chamber structure 100 includes a shell 110 and a microphone holder 120. The shell 110 has a first hole 111, and the first hole 111 has a width that is constant in the direction along an axis Y. The microphone holder 120 is disposed in the shell 110, and the microphone holder 120 has a second hole 121 corresponding to the first hole 111. The first hole 111 and the second hole 121 form a front chamber C. The microphone unit 11 is disposed on the microphone holder 120, and the voice reception hole 11A of the microphone unit 11 is communicated with the front chamber C. The mesh structure 12 is sandwiched between the shell 110 and the microphone holder 120 and is located between the first hole 111 and the second hole 121. The foam structure 13 is sandwiched between the mesh structure 12 and the microphone holder 120.

In this embodiment, the pore size of the mesh structure 12 is less than 68 microns, and the mesh structure 12 has functions of wave filtering and dust prevention. If the mesh structure 12 has a smaller pore size and a denser distribution of pores, the external noise received by the microphone unit 11 through the voice reception hole 11A is reduced. The foam structure 13 provides an effect of improving the airtightness of the microphone unit 11 to the outside. The mesh structure 12 and the foam structure 13 of this embodiment are mesh and foam respectively, but the disclosure is not intended to limit the types of the mesh structure 12 and the foam structure 13.

Further, the first hole 111 of this embodiment has a first width W1 at a position farthest away from the microphone holder 120, and the second hole 121 includes a first section 122 and a second section 123 arranged along the axis Y. The first section 122 has a width that is tapered along the axis Y in a direction D away from the shell 110, and the second section 123 has a second width W2 that is constant in the direction along the axis Y. The first width W1 is greater than the second width W2. A length L1 of the second section 123 along the axis Y is greater than or equal to 0.35 mm. A ratio of the first width W1 to a length L2 of the front chamber C on the axis Y is less than 1.

Under the above-mentioned design of the voice reception device 10 of this embodiment, the external wind hits the width-tapered part of the first section 122 after entering the front chamber C of the microphone front chamber structure 100, so the wind energy is dispersed and weakened and then enters the microphone unit 11 through the voice reception hole 11A. Therefore, the wind noise received by the microphone unit 11 can be reduced, and as a result, the voice reception device 10 has a good noise reduction effect.

In addition, the conventional voice reception device is provided with a cover on the shell hole to reduce the amount of wind entering the voice reception device, and shifts between the shell hole and the microphone voice reception hole to prevent the external wind from directly impacting the voice reception hole of the microphone unit, thereby achieving the effect of noise reduction. However, for the conventional voice reception device, the chamber between the shell hole and the microphone voice reception hole needs to be large enough, and consequently, it is difficult to reduce the overall volume of the voice reception device. In contrast, the voice reception device 10 of this embodiment disperses and weakens the wind energy entering the microphone unit 11 through the design of the tapered width of the first section 122. Therefore, while the voice reception device 10 has a noise reduction effect, the volume of the front chamber C can be effectively reduced, and as a result, the volume of the voice reception device 10 can be effectively reduced.

Furthermore, in the microphone front chamber structure 100 of this embodiment, the second hole 121 of the microphone holder 120 is provided with the second section 123 having the length L1 greater than or equal to 0.35 mm, which helps to eliminate a dimensional error of the first section 122 of the second hole 121 due to process factors.

Therefore, the first section 122 can have higher dimensional accuracy and manufacturing stability, which ensures that the wind energy entering the first section 122 from the outside can be dispersed and weakened by the first section 122 stably and effectively before being received by the microphone unit 11, so that the voice reception device 10 maintains a good noise reduction effect.

In this embodiment, the voice reception device 10 further includes a sealing ring 14, the microphone holder 120 includes an annular groove 124 located on an outer side wall S1, and the shell 110 includes a positioning groove 112 located on an inner side wall S2. The sealing ring 14 is located in the annular groove 124 and abuts against the positioning groove 112 of the shell 110. The design of the positioning groove 112 and the annular groove 124 facilitates the alignment between the shell 110 and the microphone holder 120, which enables the voice reception device 10 to more accurately maintain the dimensions mentioned in the preceding paragraphs, thereby achieving a good noise reduction effect. In addition, the microphone holder 120 does not directly contact the shell 110 due to the configuration of the sealing ring 14. Since the shell 110 and the microphone holder 120 are not in direct contact with each other, the vibration of one of them can be prevented from affecting the other, so that a good vibration isolation effect is achieved between the shell 110 and the microphone holder 120.

In this embodiment, the shell 110 includes a first wall 113 surrounding the first hole 111, and the microphone holder 120 includes a second wall 125 surrounding the second hole 121. A first angle A1 (FIG. 1B) exists between the first wall 113 and the second wall 125, and a second angle A2 (FIG. 1B) exists between a connection line F (FIG. 1B), which is between a boundary between the first section 122 and the second section 123 and a position of the first hole 111 farthest away from the microphone holder 120, and the axis Y. The first angle A1 is greater than 90 degrees, and the second angle A2 is greater than 0 degrees and less than 25 degrees. Through the design of the above-mentioned angles, the structure of the tapered width of the first section 122 of the second hole 121 disperses and weakens the wind energy entering the microphone unit 11, so that the voice reception device 10 maintains a good noise reduction effect.

In addition, a third angle A3 (FIG. 1B) exists between the second wall 125 and the mesh structure 12 of this embodiment, and a fourth angle A4 (FIG. 1B) exists between the first wall 113 and the mesh structure 12. The third angle A3 is greater than 0 degrees, the sum of the second angle A2 and the third angle A3 is less than 90 degrees, and the fourth angle A4 is greater than or equal to 90 degrees. The fourth angle A4 of this embodiment is equal to 90 degrees as shown in FIG. 1B, but in other embodiments of the disclosure, the fourth angle A4 may be greater than 90 degrees, which is not limited in the disclosure. Through the design of the above-mentioned angles, the structure in which the first width W1 is greater than the second width W2 is maintained. Therefore, an increase of the resonance cavity, which results from a small opening of the first hole 111 and a large internal cavity when the first width W1 is less than the second width W2, is avoided to prevent a turbulent flow generated by the wind from colliding in the cavity and enhancing the noise. Alternatively, the external wind is prevented from directly passing through the second hole 121 from the first hole 111 to reach the voice reception hole 11A and impact the microphone unit 11 when the first width W1 is equal to the second width W2, which results in poor noise reduction.

It should be noted that, if the second angle A2 of this embodiment is equal to 0 degrees and the third angle A3 is 0 degrees to 90 degrees, the front chamber C forms a resonant cavity that the first width W1 is equal to or less than the second width W2, the width of the first hole 111 is gradually expanded along the axis Y in the direction D, the width of the first section 122 is tapered along the axis Y in the direction D, and the second section 122 maintains the second width W2, which affects the original noise reduction effect of the voice reception device 10.

In addition, if the second angle A2 of this embodiment is less than 0 degrees and the third angle A3 is greater than 90 degrees, the front chamber C forms a resonant cavity that the first width W1 is less than the second width W2, the width of the first hole 111 is constant along the axis Y in the direction D, the width of the first section 122 is gradually expanded along the axis Y in the direction D, and the second section 122 maintains the second width W2, which also affects the original noise reduction effect of the voice reception device 10.

Therefore, in an exemplary embodiment of the disclosure, at least a part of the first hole 111 maintains the first width W1 along the axis Y in the direction D, the width of the first section 122 is tapered along the axis Y in the direction D, and the second section 122 maintains the second width W2. In this way, the front chamber C does not form a resonant cavity as mentioned in the preceding paragraphs. After entering the front chamber C, the external wind hits the width-tapered part of the first section 122 and the wind energy is weakened. Therefore, the voice reception device 10 has a good noise reduction effect.

Figure 1C:
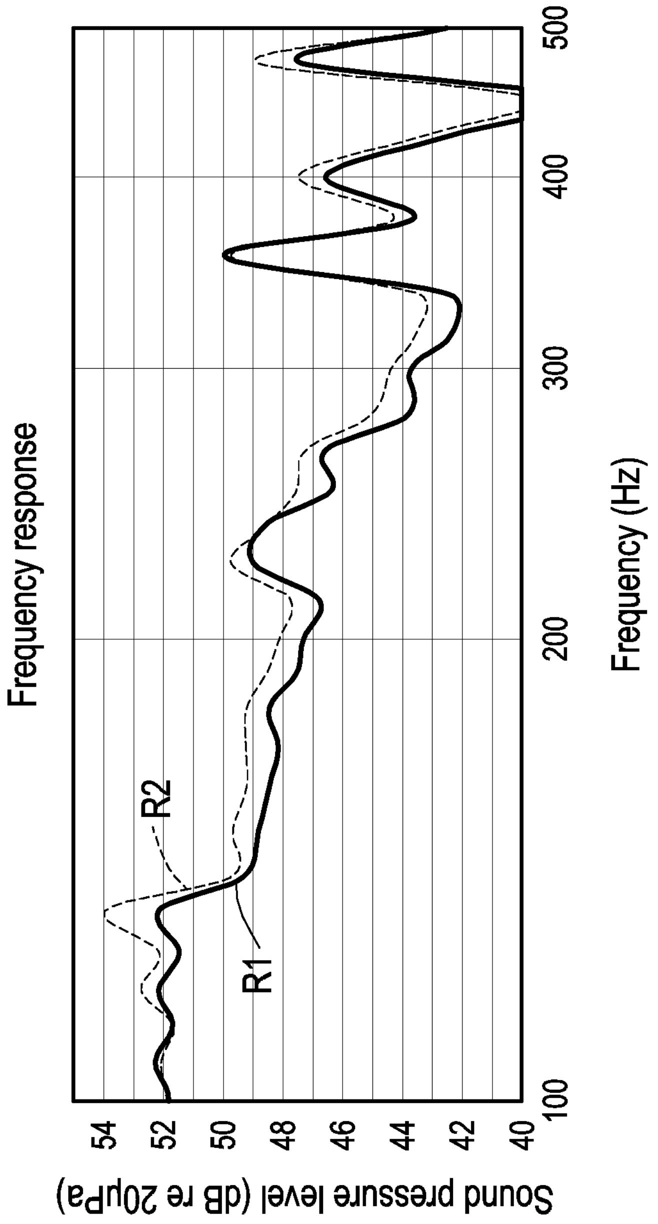
FIG. 1C is a diagram showing the relationship between frequency and sound pressure level of the voice reception device of FIG. 1A and FIG. 1B and the voice reception device in which the first section is not tapered after receiving an external sound.

FIG. 1C is a diagram showing the relationship between frequency and sound pressure level of the voice reception device of FIG. 1A and FIG. 1B and the voice reception device in which the first section is not tapered after receiving an external sound. Referring to FIG. 1A to FIG. 1C, the curve R1 indicates the sound pressure level of the voice reception device 10 shown in FIG. 1A and FIG. 1B, and the curve R2 indicates the sound pressure level of the voice reception device 10 shown in FIG. 1A and FIG. 1B when the first section 122 is not tapered. When the first section 122 is tapered, the voice reception device 10 of this embodiment has a lower sound pressure level than when the first section 122 is not tapered. Since the tapered first section 122 disperses and weakens the energy of the external sound, the voice reception device has a better noise reduction effect.

Figure 2A:
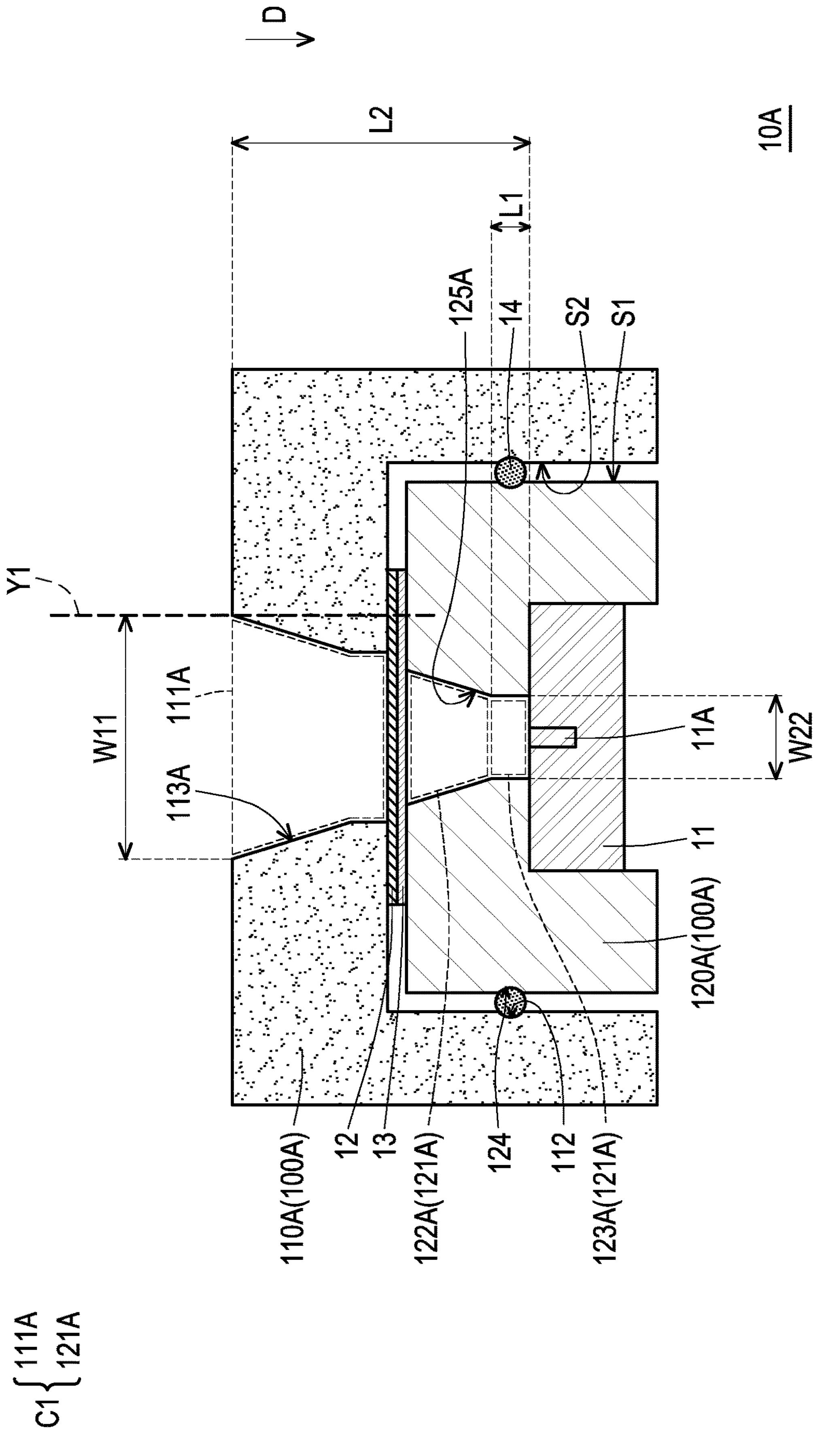
FIG. 2A and FIG. 2B are schematic cross-sectional views of the voice reception device according to another embodiment of the disclosure.
Figure 2B:
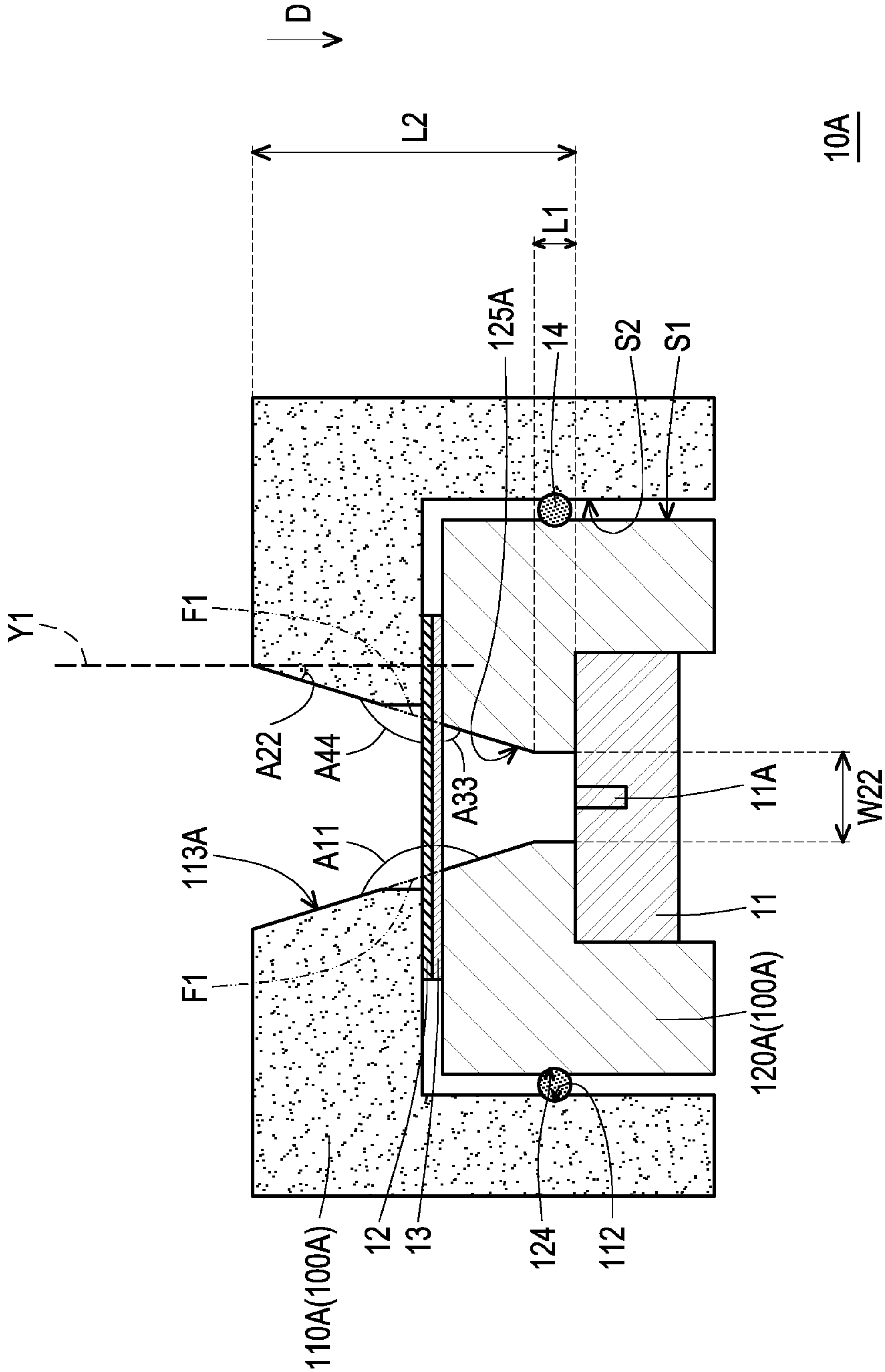

FIG. 2A and FIG. 2B are schematic cross-sectional views of the voice reception device according to another embodiment of the disclosure. Referring to FIG. 1A, FIG. 2A, and FIG. 2B, the differences between the voice reception device 10A shown in FIG. 2A and FIG. 2B and the voice reception device 10 shown in FIG. 1A lie in that the first hole 111A of the voice reception device 10A has a width that is partially tapered along an axis Y1 in the direction D close to the microphone holder 120, the first wall 113A is therefore inclined to the mesh structure 12 and affects the range of the first hole 111A and the front chamber C1, and the fourth angle A44 (FIG. 2B) between the first wall 113A and the mesh structure 12 is greater than 90 degrees. Since the inclination of the first wall 113A of the disclosure to the mesh structure 12 affects the size of the first width W11 (FIG. 2A), the degree to which the first wall 113A is inclined to the mesh structure 12 is limited by the ratio of the first width W11 to the length L2 being less than 1. In this embodiment, the first wall 113A and the second wall 125A have the same degree of inclination, but in other embodiments of the disclosure, the inclination degrees of the first wall 113A and the second wall 125A may be different, and the disclosure is not limited thereto.

According to actual measurement, when the ratio of the first width W1 (or W11) to the length L1 (or L2) in the voice reception device 10 (or 10A) of this embodiment is relatively small, the minimum angle that the second angle A2 (or A22) needs to satisfy is relatively small; conversely, when the ratio of the first width W1 (or W11) to the length L1 (or L2) in the voice reception device 10 (or 10A) is relatively large, the minimum angle that the second angle A2 (or A22) needs to satisfy is relatively large, so that the voice reception device 10 or 10A has a good noise reduction effect.

To sum up, in the microphone front chamber structure and the voice reception device of the disclosure, the external wind can repeatedly hit the width-tapered part of the first section after entering the front chamber formed by the first hole and the second hole of the microphone front chamber structure, so that the wind energy is dispersed and weakened before entering the microphone voice reception hole. Thereby, the wind noise received by the microphone unit can be reduced, and as a result, the voice reception device has a good noise reduction effect. In addition, the conventional voice reception device requires a cover provided on the shell hole and needs to shift between the shell hole and the microphone voice reception hole to achieve the noise reduction effect. Since the chamber between the shell hole and the microphone voice reception hole needs to be large enough, it is difficult to reduce the overall volume of the voice reception device. In contrast, the voice reception device of the disclosure disperses and weakens the wind energy entering the microphone unit through the design of the tapered width of the first section. Therefore, the volume of the chamber between the shell hole and the microphone voice reception hole can be effectively reduced, and as a result, the voice reception device has a reduced overall volume.

Furthermore, in the microphone front chamber structure of the disclosure, the second hole of the microphone holder is provided with the second section. Therefore, the first section of the second hole can have higher accuracy and stability during the manufacturing process, which ensures that the wind energy entering the first section from the outside can be effectively dispersed and weakened by the first section before being received by the microphone unit, so that the voice reception device maintains a good noise reduction effect.

What is claimed is:

1. A voice reception device, comprising:

a shell having a first hole;

a microphone holder disposed in the shell and having a second hole corresponding to the first hole, wherein the microphone holder is separated from the shell, the first hole and the second hole form a front chamber, the first hole has a first width at a position farthest away from the microphone holder, the second hole comprises a first section and a second section arranged along an axis, a ratio of the first width to a length of the front chamber on the axis is less than 1, the first section is located between the first hole and the second section on the axis, the first section has a width that is tapered along the axis in a direction away from the shell, the second section has a second width that is constant in the direction along the axis, and the first width is greater than the second width;

a microphone unit disposed on the microphone holder and having a voice reception hole communicated with the front chamber; and a mesh structure sandwiched between the shell and the microphone holder and located between the first hole and the second hole.

2. The voice reception device according to claim 1, wherein a length of the second section along the axis is greater than or equal to 0.35 mm.

3. The voice reception device according to claim 1, wherein the shell comprises a first wall surrounding the first hole, the microphone holder comprises a second wall surrounding the second hole, and a first angle between the first wall and the second wall is greater than 90 degrees.

4. The voice reception device according to claim 1, wherein the microphone holder comprises a second wall surrounding the second hole, a second angle exists between a connection line, which is between a boundary between the first section and the second section and a position of the first hole farthest away from the microphone holder, and the axis, and the second angle is greater than 0 degrees and less than 25 degrees.

5. The voice reception device according to claim 1, wherein the microphone holder comprises a second wall surrounding the second hole, a third angle exists between the second wall and the mesh structure, and the third angle is greater than 0 degrees.

6. The voice reception device according to claim 1, wherein the microphone holder comprises a second wall surrounding the second hole, a second angle exists between a connection line, which is between a boundary between the first section and the second section and a position of the first hole farthest away from the microphone holder, and the axis, a third angle exists between the second wall and the mesh structure, and a sum of the second angle and the third angle is less than 90 degrees.

7. The voice reception device according to claim 1, wherein the shell comprises a first wall surrounding the first hole, a fourth angle exists between the first wall and the mesh structure, and the fourth angle is greater than or equal to 90 degrees.

8. The voice reception device according to claim 1, wherein the first hole has a width that is constant in the direction along the axis.

9. The voice reception device according to claim 1, wherein the first hole has a width that is tapered along the axis in a direction close to the microphone holder.

10. The voice reception device according to claim 1, wherein a pore size of the mesh structure is less than 68 microns.

11. The voice reception device according to claim 1, further comprising a sealing ring, wherein the microphone holder comprises an annular groove located on an outer side wall, the sealing ring is located in the annular groove and abuts against the shell, and the microphone holder is not in direct contact with the shell.

12. A microphone front chamber structure adapted to be disposed on a front side of a voice reception hole of a microphone unit, the microphone front chamber structure comprising:

a shell having a first hole; and a microphone holder disposed in the shell and having a second hole corresponding to the first hole, wherein the microphone holder is separated from the shell, the first hole and the second hole form a front chamber, the first hole has a first width at a position farthest away from the microphone holder, the second hole comprises a first section and a second section arranged along an axis, a ratio of the first width to a length of the front chamber on the axis is less than 1, the first section is located between the first hole and the second section on the axis, the first section has a width that is tapered along the axis in a direction away from the shell, the second section has a second width that is constant in the direction along the axis, and the first width is greater than the second width.

* * * * *